No. 734,986. PATENTED JULY 28, 1903.
J. M. STADEL.
GENERATOR FOR GAS ENGINES.
APPLICATION FILED JUNE 23, 1902.
NO MODEL.
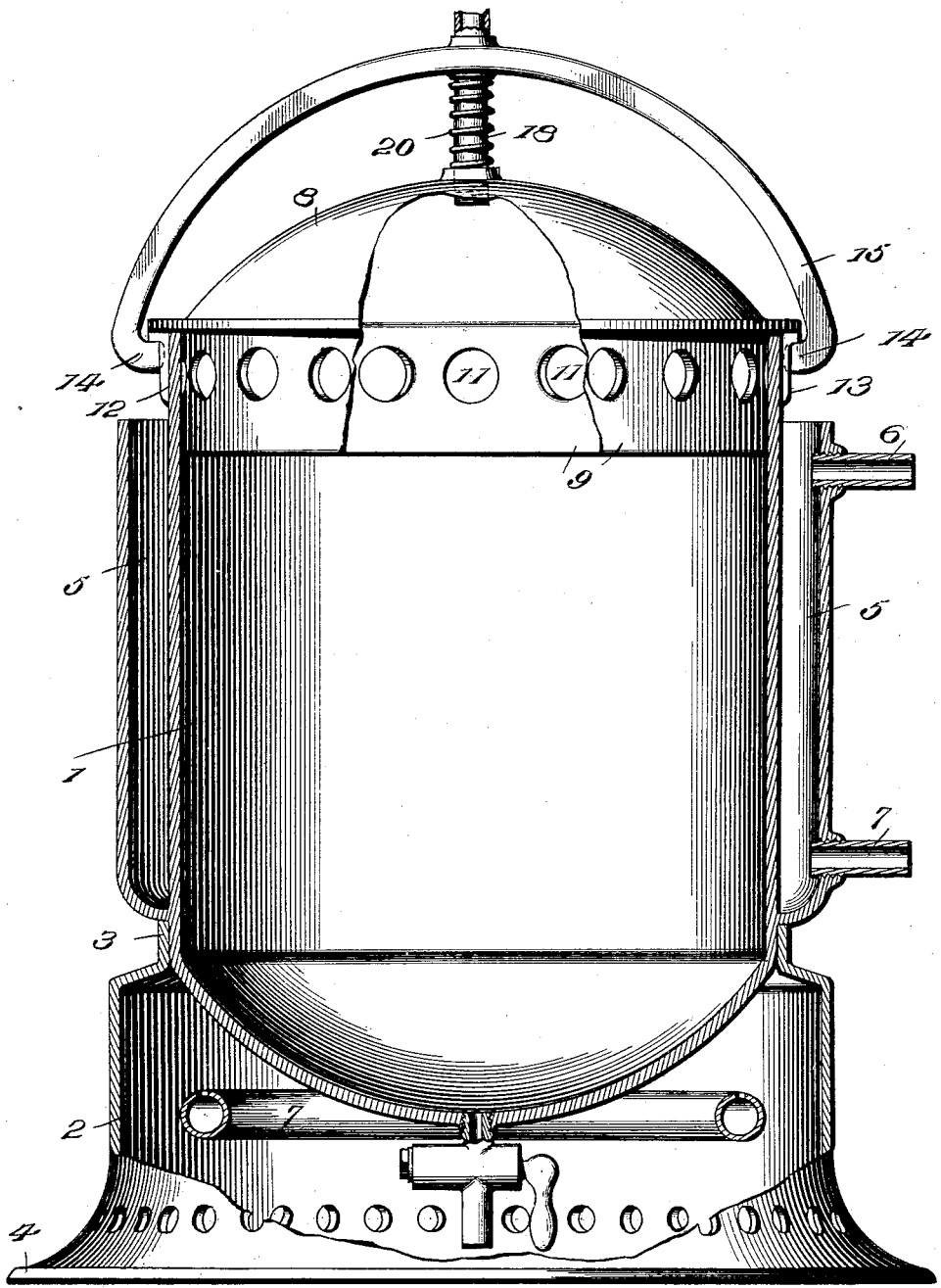
Witnesses
Inventor
J. M. Stadel.
By Thos. E. Robertson Attorney No. 734,986.                                                  Patented July 28, 1903.

UNITED STATES PATENT OFFICE.

JOHN MARTIN STADEL, OF WILMINGTON, DELAWARE, ASSIGNOR OF ONE-HALF TO WILLIAM A. McCOWEN, OF WILMINGTON, DELAWARE.

GENERATOR FOR GAS-ENGINES.

SPECIFICATION forming part of Letters Patent No. 734,986, dated July 28, 1903.

Application filed June 23, 1902. Serial No. 112,929. (No model.)

*To all whom it may concern:*

Be it known that I, JOHN MARTIN STADEL, a citizen of the United States of America, and a resident of Wilmington, in the county of Newcastle and State of Delaware, have invented certain new and useful Improvements in Generators for Gas-Engines, of which the following is a specification.

This invention relates to certain new and useful improvements in generators for converting gasolene into gas previous to its being used in a gas-engine; and the object of my invention is to provide a simple generator of inexpensive construction which can be used without the danger usually incident to such purposes.

In its preferred form my generator consists of a chamber in which the gasolene is fed, and surrounding this chamber is a water-jacket into which hot water is circulated for the purpose of maintaining the atmosphere at such a temperature as will generate a gas as fast as the gasolene is fed into the generator. The generator is also provided with a spring-actuated cap or cover, which is arranged to automatically open and permit the escape of the gas in the event of too much gas being generated.

Having in view a generator of the general class above described, my invention consists in the peculiar construction, arrangement, and combinations of parts, as hereinafter more particularly described and then definitely claimed.

The accompanying drawing represents a vertical central section of a generator constructed in accordance with my invention.

Referring now to the details of the said drawing by numerals, 1 represents a suitable receptacle, which may be supported on a base of any desirable construction, but preferably of the shape shown in the drawing, which consists of a cylindrical shell 2, with a supporting-ring 3 at the upper end thereof, and a base-flange 4, by which the base may be secured to any suitable support.

Surrounding the receptacle 1 is a water-jacket 5, which is preferably open at the top, and entering this water-jacket 5 is an inlet 6 and an outlet 7, by which hot water may be delivered and taken from the jacket, thus insuring rapid circulation.

It will be evident from the construction so far described that if gasolene is fed into the generator and hot water is fed to the inlet 6 the temperature within the receptacle or generator 1 may be maintained sufficiently high to generate a gas as fast as the gasolene is fed into the receptacle. Underneath the receptacle 1 I have shown a burner 7, which may be used in lieu of or supplemental to the jacket 5, as circumstances require.

Fitting within the upper end of the generator or receptacle 1 is a hood or cover 8, which has a downwardly-extending ring or flange 9, closely fitting the walls of the generator 1. The hood or cover 8 also has a horizontally-extending flange 9 to fit over the upper edge of the walls of the generator or receptacle 1. The downwardly-projecting ring or flange 9 is provided with escape-openings 11, which are normally covered by the walls of the receptacle or generator 1.

Secured to the upper edge of the generating-chamber 1, on each side thereof, are brackets 12 and 13, which are slotted or recessed to receive the bent ends 14 of a yoke 15, which is provided with an opening immediately over the center of the generator. The hood or cover 8 is also provided with a screw-threaded opening immediately under and in line with the opening in the yoke, and a screw-threaded tube 18 passes through the opening in the yoke 15 and is screwed in the screw-threaded aperture in the hood or cover 8, as illustrated in the drawing. Interposed between the swelled portion of the hood or cover 8 and the yoke 15 and surrounding the tube 18 is a stiff coiled spring 20, which tends to retain the hood or cover 8 in its closed position, as shown in the drawing. This construction is for the purpose of insuring safety at all times no matter how much gas may be generated within the receptacle 1, and it is obvious that if too much gas is generated within the receptacle and the pressure becomes so great as to overcome the tension of the spring 20 the hood or cover 8 will be forced upward until the escape-openings 11 are exposed, when the gas can escape until the pressure is decreased, so that the spring 20 will force the cover 8 down into its usual position.

I have illustrated and described no means for feeding gasolene into the generating-chamber or for delivering the gas therefrom; but it will be obvious that suitable provision for feeding the gasolene and for delivering the gas may be made at any place in the generating-chamber, although I prefer that the gasolene pass through and the gas be delivered from the tube 18.

I have illustrated both a water-jacket and a burner for maintaining a sufficiently high temperature to generate the gas; but it is obvious that either of these may be dispensed with, as in some situations it may be difficult to provide hot water, in which case the burner may be used. I do not, however, limit my invention to either one of these, as parts thereof may be used with both heating appliances or with either one.

At the lower end of the generating-chamber I have provided a cock 22, by which the generator may be cleaned out in case of necessity.

I am aware that it has heretofore been proposed to connect an ordinary safety-valve to the top of a generating-chamber and do not attempt to claim this as my invention, as I regard my construction as entirely different therefrom and have therefore set forth in most of my claims a "hood" or "cover," which I regard as differentiating my invention from the prior art. Of course I do not mean by this term to limit my claims to a vessel having a hood or cover covering the entire head of the generator, as it is obvious that the cover can be made smaller, if so desired.

What I claim as new is—

1. A generating-chamber having means for heating the same, and a hood or cover arranged to open in case of excessive generation, substantially as described.

2. A generating-chamber having means for heating the same, and a spring-actuated cap or cover arranged to open in case of excessive generation, substantially as described.

3. In a generator, the combination of a generating-chamber, a hood or cover therefor, and a spring tending to maintain said cover in its closed position, substantially as described.

4. In a generator, the combination of a generating-chamber, a hood or cover therefor having a projecting ring or flange provided with escape-openings, and a spring for maintaining said cover in its closed position, substantially as described.

5. In a generator, the combination of a generating-chamber having a water-jacket for heating the same, a hood or cover for said chamber, and a spring tending to maintain said cover in its closed position, substantially as described.

6. In a generator, the combination of a generating-chamber having a water-jacket for heating the same, a hood or cover for said chamber having a projecting ring or flange provided with escape-openings and a spring for maintaining said hood or cover in its closed position, substantially as described.

7. In a generator, the combination of a generating-chamber arranged with means for heating the same, a hood or cover for said chamber having a projecting ring or flange provided with escape-openings, a yoke having a connection with said generating-chamber and extending over said hood or cover, and a spring arranged between said yoke and said hood or cover, for maintaining said cover in its closed position, substantially as described.

8. In a generator, the combination of a generating-chamber, having a water-jacket surrounding the same, a hood or cover for said chamber having a projecting ring or flange provided with escape-openings, a yoke having a connection with said chamber and extending over said hood or cover, and a spring interposed between said yoke and said hood or cover for maintaining said hood or cover in position, substantially as described.

9. A generating-chamber having means for heating the same, and a device arranged to open in case of excessive generation, the said device also acting as a means of supplying the gas delivered from the said chamber, substantially as described.

Signed by me at Wilmington this 2d day of June, 1902.

JOHN MARTIN STADEL.

Witnesses:
AMOS COLE,
J. W. COOKE.